(No Model.)

E. W. OTIS.
WHEEL.

No. 325,439. Patented Sept. 1, 1885.

WITNESSES:
Chas. S. Gooding
Charles G. Keyes

INVENTOR:
Elisha W. Otis,
by N. H. Spencer,
Attorney

UNITED STATES PATENT OFFICE.

ELISHA W. OTIS, OF CHELSEA, ASSIGNOR TO WM. G. BELL, OF BOSTON, MASSACHUSETTS.

WHEEL.

SPECIFICATION forming part of Letters Patent No. 325,439, dated September

Application filed January 22, 1885. (No model.)

*To all whom it may concern:*

Be it known that I, ELISHA W. OTIS, a citizen of the United States, residing at Chelsea, in the county of Suffolk and State of Massachusetts, have invented certain new and useful Improvements in Wheels or Rollers; and I do hereby declare that the same are fully described in the following specification and illustrated in the accompanying drawings.

In my present invention I employ a spindle having a terminal head and a groove immediately adjacent thereto, with a roller having within it a locking-piece to engage in said groove to retain the roller on the spindle. This locking-piece is spring-pressed and is introduced radially, the opening therefor in the periphery of the roller being closed by a plug or equivalent means. I also provide for insertion of the spindle and its removal from the wheel by forming a perforation in the inner side of the wheel, through which a key, bent rod, or wire, distinct from the wheel, reaches a hole or groove in the locking-piece and retracts said piece against the resistance of the spring.

Figure 1:
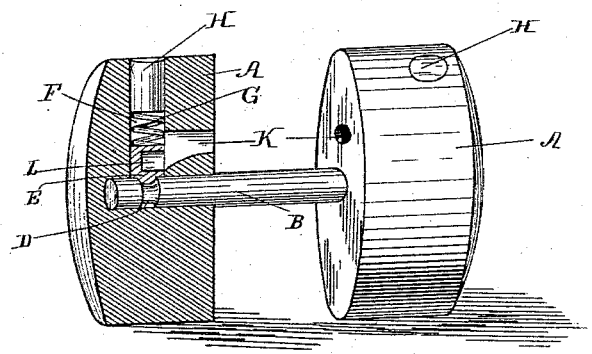
Figure 2:
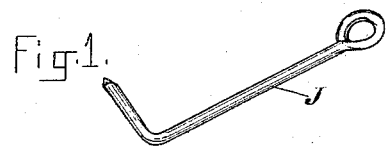
Figure 2:
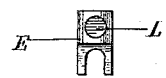

The drawings show, in Figure 1, a pair of my improved rollers on their spindle, one of them in vertical section, and also a suitable hook or key for raising the locking-piece. Fig. 2 shows the preferred form of locking-piece, detached.

A is the wheel or roller, formed with an axial perforation of a diameter to receive the spindle B, and extending nearly, but not quite, through the wheel, so that the outer face thereof is smooth and solid.

C is the terminal head at each end of the spindle, and D the groove adjacent thereto, formed to receive the tip of the radial locking-piece E loose in the radial perforation F, and pressed toward the neck of the spindle by the spring G, held down by the plug H. This plug closes the opening in the periphery of the roller after the parts are in position. The radial perforation F, terminating at or just beyond the axis of the wheel, permits both prongs of the locking-piece to engage in the groove D—one on each side of the narrow neck of the spindle—without being pressed by the spring against said neck, the bottom of the perforation F forming a stop. The end of the spindle is prolonged beyond the groove D to form an additional bearing for the roller, about as in Fig. 1, thus relieving the locking-piece from strain.

To facilitate removal of the spindle from the wheel, and its subsequent insertion when required, I make a hole, L, in the locking-piece, or a recess or groove in its periphery, and I form an opening, K, from this hole through the inner face of the wheel, so that a rod or wire, as J, may be inserted and employed to force backward the locking-piece. This movement compresses the spring G and releases the spindle, or permits it to again enter the axial perforation after removal from the wheel. The opening K is narrow, but may diverge inwardly in a radial plane, as shown, to permit movement of the detaching-lever while the locking-piece is moved radially.

I am aware that radial locking-pieces have been applied to the hubs of wagon-wheels to secure them on their axles, as in the patents to Clow, September 20, 1870, and Patterson, May 8, 1883. My plan is, however, wholly different from these, since I introduce the locking devices through the tread-surface of the wheel itself, and employ an arrangement of parts unlike those shown in said patents.

I claim as my invention—

1. The grooved spindle B, in combination with the wheel or roller A, having a radial recess, F, through its periphery or tread, and within such recess a locking-piece to engage in the spindle-groove, a spring to press said piece inwardly, and a plug to support said spring and complete the tread-surface of the wheel, substantially as set forth.

2. The wheel A, perforated axially and having the radial recess F through its tread-surface, and the lateral opening K, in combination with the locking-piece E, spring G, and plug H, located in said recess, substantially as set forth.

In testimony whereof I hereto affix my signature in presence of two witnesses.

ELISHA W. OTIS.

Witnesses:
 A. H. SPENCER,
 E. A. PHELPS.